United States Patent [19]
Hagner

[11] Patent Number: 5,830,561
[45] Date of Patent: Nov. 3, 1998

[54] INFORMATION BEARING CARD

[76] Inventor: Hans Hagner, Pfahlberg 18, 72280 Dornetetten, Germany

[21] Appl. No.: 541,193

[22] Filed: Oct. 11, 1995

[30] Foreign Application Priority Data

Oct. 11, 1994 [DE] Germany ............... 44 36 302.8

[51] Int. Cl.$^6$ .............. B32B 3/00; B32B 27/32; B42D 15/10
[52] U.S. Cl. .......... 428/195; 428/206; 428/515; 428/516; 428/916; 430/10; 430/14; 283/107; 283/111; 283/112; 283/904
[58] Field of Search ..................... 428/515, 516, 428/206, 189, 916, 195, 201; 283/904, 107, 108, 109, 110, 112; 156/277, 283; 235/380, 488; 430/10, 14

[56] References Cited

U.S. PATENT DOCUMENTS 4,429,015  1/1984  Sheptak .................... 428/201

Primary Examiner—Paul J. Thibodeau
Assistant Examiner—D. Lawrence Tarazano
Attorney, Agent, or Firm—Pillsbury Madison & Sutro LLP

[57] ABSTRACT

A card, such as an ID card, is composed of the following layers: at least one core layer containing at least one first core component layer of a first composition, consisting of a polypropylene block polymer and/or polyropylene homopolymer or a mixture thereof and a second core component layer provided on at least the exterior face to which an outer layer has been laminated and is made of a second composition, consisting of unoriented polypropylene or an unoriented copolymer; at least one outer layer containing at least one outer component layer made of a third composition of polypropylene homopolymer and a second outer component layer provided on at least the exterior face with which the outer layer is laminated to the core layer and which contains a fourth composition of unoriented-polypropylene or an unoriented copolymer. The first and second core component and outer component layers are solidly connected with each other by coextrusion.

34 Claims, 5 Drawing Sheets

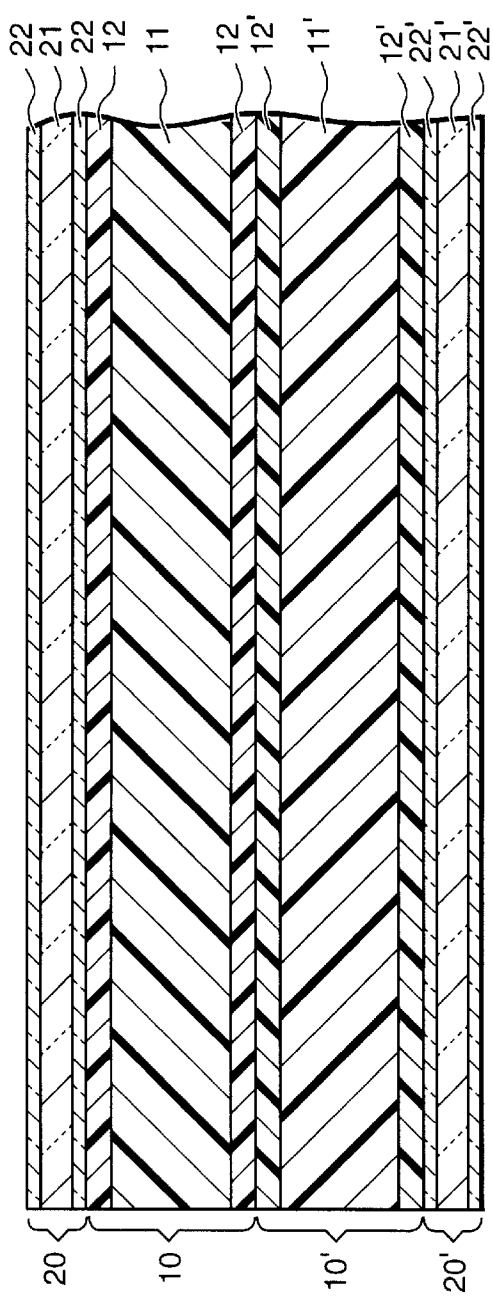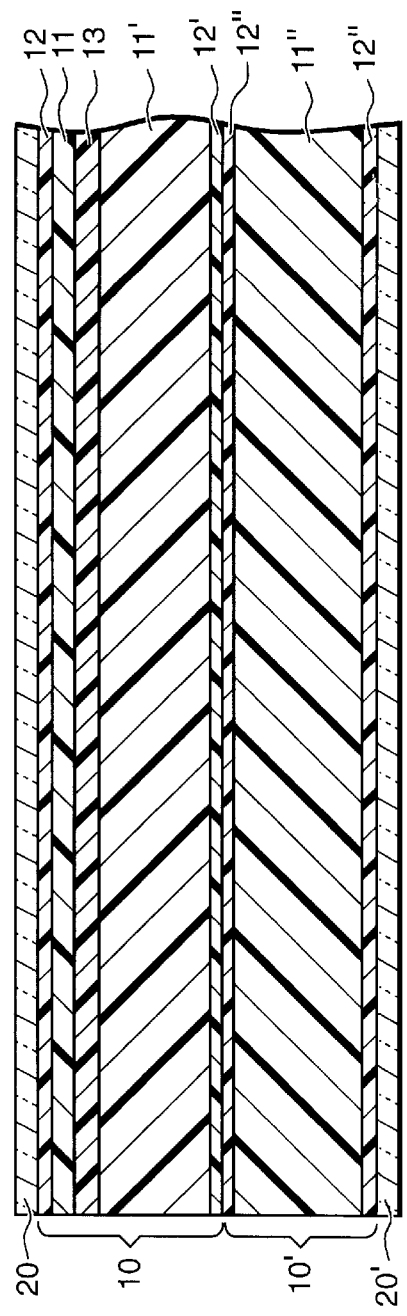

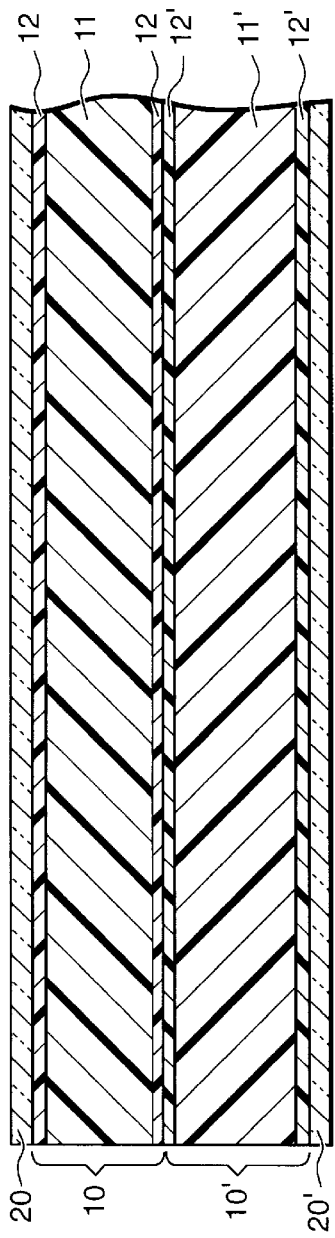
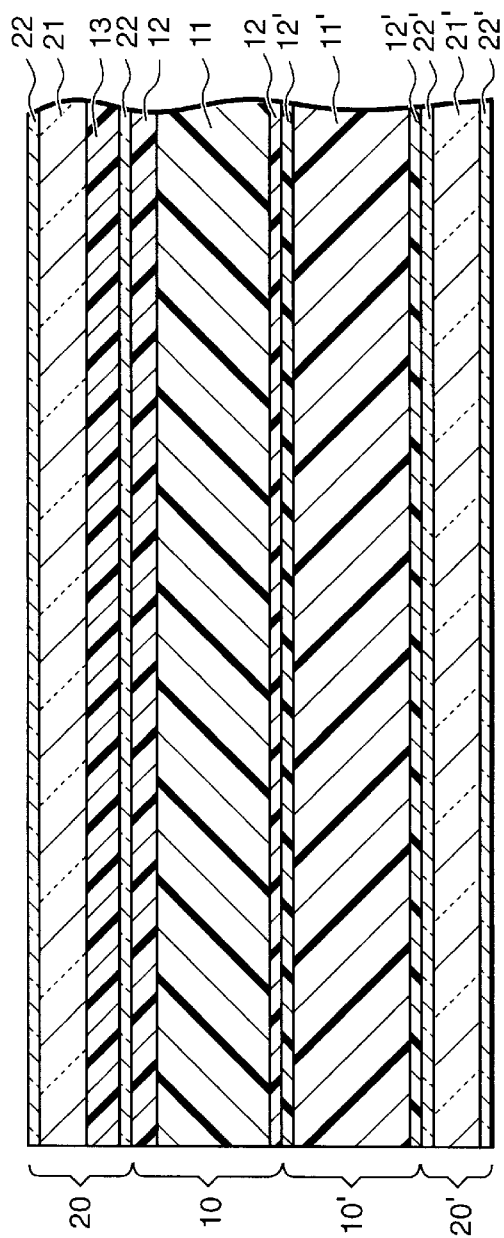

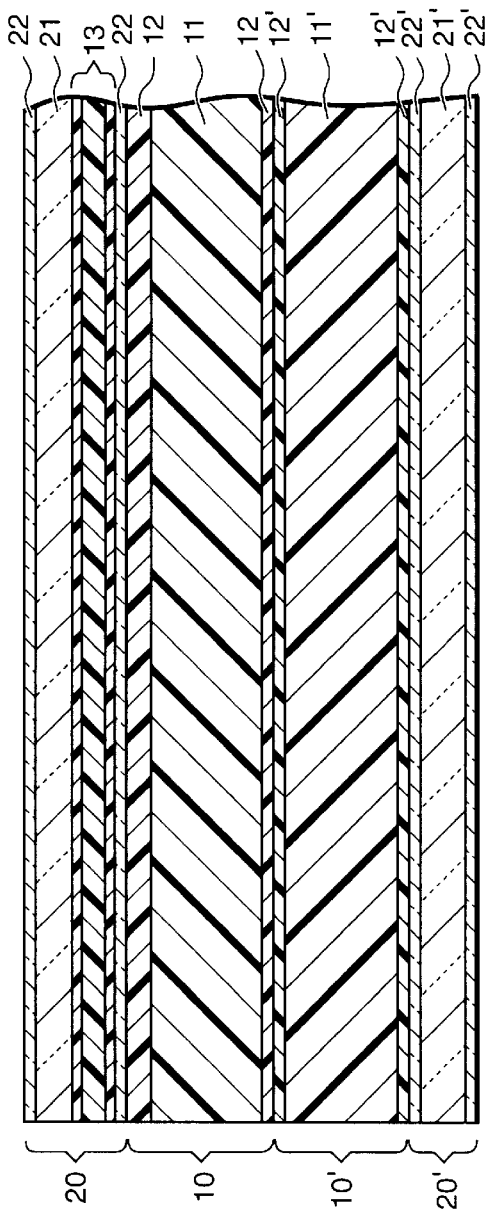
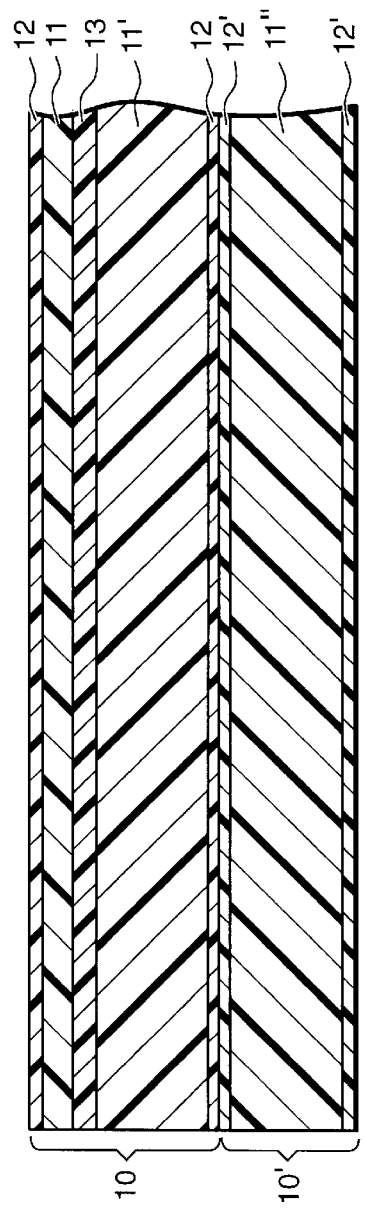

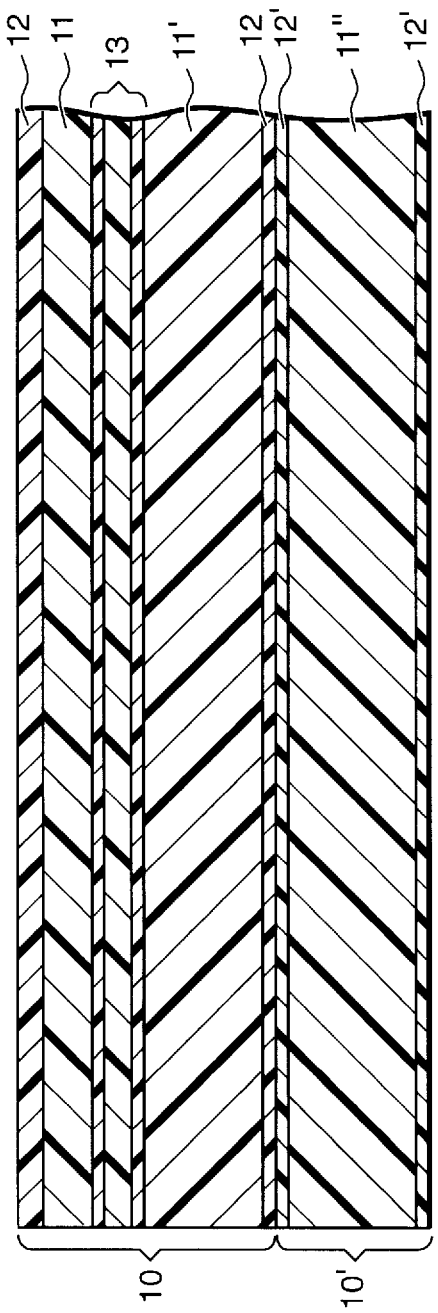
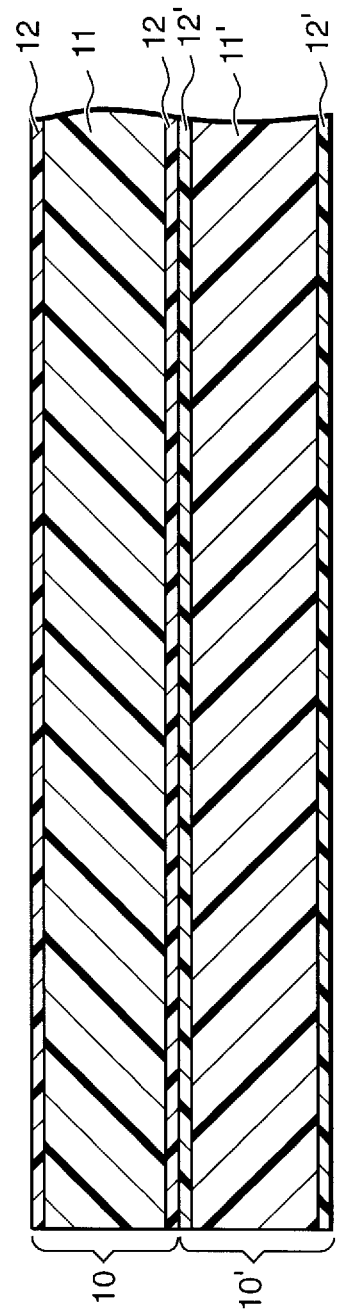

INFORMATION BEARING CARD

FIELD OF THE INVENTION

The invention relates to a card, exemplified by an ID card with a least one machine-readable data support, in particular a magnetic strip and/or embedded microchip, as well as at least one printed image, comprising a core layer and at least one outer layer for covering at least one of the exterior faces of the card.

BACKGROUND OF THE INVENTION

Such ID cards are today used in such profusion that their manufacturing cost as well as their final disposal play a not insignificant role in the whole economy. PVC has prevailed as the material of choice because of its low price and advantageous material properties during production. However, not inconsiderable environmental problems are connected with the final disposal of this plastic material.

OBJECT AND SUMMARY OF THE INVENTION

It is an object of the invention to provide a card, such as an ID card, of the previously mentioned type, wherein the solidity criteria required for ID cards in regard to simple production and further processing are met and environmental loads in connection with their final disposal are reduced.

The above and other objects are attained by a card with a least one machine-readable data support, comprising a core layer and at least one outer layer for covering at least one of the exterior faces, wherein: the core layer includes at least one first core component layer made of a first composition which includes at least one of a PP block polymer, PP homopolymer, and a mixture thereof, and a second core component layer which is made of a second composition of unoriented PP or an unoriented copolymer, the second core component layer defining an exterior face of the core layer; the outer layer is laminated on the exterior face of the core layer and includes at least one first outer component layer made of a third composition of PP homopolymer, and at least on the exterior face on which the outer layer is laminated to the core layer, a second outer component layer made of a fourth composition of unoriented-PP or an unoriented copolymer; and the first and second core component layers and outer component layers are solidly connected with each other by coextrusion.

Objects according to the invention are further achieved by an information-bearing card with a least one machine-readable data support, comprising a core layer having exterior faces and at least one outer layer for covering at least one of the exterior faces, wherein: the core layer includes at least two first core component layers made of a first composition which includes at least one of a PP block polymer, a PP homopolymer, and a mixture thereof, each first core component layer having an outer face, and second core component layers made of a second composition of unoriented PP or an unoriented copolymer, the second core component layers being disposed on respective outer faces defining an exterior face of the core layer; the outer layer is a coating; and the first and second core component layers are connected with each other by coextrusion.

Objects in accordance with the invention are further achieved by including in the card at least one of a magnetic strip, an embedded microchip, and a printed image.

In accordance with a first embodiment of the invention, the core layer includes at least one core component layer made of a first composition comprising a polypropylene (PP) block copolymer and/or PP homopolymer or a mixture thereof. A second core component layer made of a second composition containing unoriented PP or an unoriented copolymer is applied to at least the exterior face to which an outer layer is laminated. At least one outer layer is provided which includes at least one first outer component layer made of a third composition consisting of PP homopolymer. A second outer component layer made of a fourth composition consisting of unoriented PP or an unoriented copolymer is provided on at least the exterior face on which the outer layer is laminated to the core layer. The first and the second core layer components and outer layer components are firmly connected with each other by coextrusion.

It is possible by means of the mentioned layer structure to achieve the required rigidity of the ID card.

In accordance with a second embodiment, the core layer has at least two first core layer components made of a first composition comprising a PP block polymer and/or a PP homopolymer or a mixture thereof. Respectively one second core layer component is provided at least on the sides of the first core layer components facing each other and contains unoriented PP or an unoriented copolymer. The outer layer is preferably embodied as a coating. The first and second core layer components are connected with each other by coextrusion. The required solidity properties of the card are also assured by this particularly simple embodiment of the ID card.

With the first embodiment of the invention, the core layer also advantageously consists of at least two first core layer components, which preferably have second core layer components coextruded on both sides. By means of these coextruded second core layer components, the first core component layers can be connected with each other in a simple yet extremely stable manner.

In the first embodiment of the invention the printed image is placed either on the second core component layer or on the second outer component layer facing the second core component layer.

In an embodiment of the invention, the outer layer is made of biaxially drawn PP, which lends improved rigidity to the entire card.

Preferably the first composition contains 15 to 25 weight-%, preferably 20 weight-% of filler, in particular talcum powder; 4 to 6 weight-%, preferably 5 weight-% of a dye; 0 to 5 weight-%, in particular 5 weight-% of PP homopolymer, in particular the 1100 L type; and 64 to 81 weight-%, in particular 70 weight-% of block polymer, in particular the 2309 KX type. The type designations are commercial designations of BASF.

The second composition preferably contains 95 to 99 weight-%, preferably 97 weight-% of block polymer, in particular the 3520 LX type, and 1 to 5 weight-%, preferably 3 weight-% of a nucleation agent, in particular the NU 10 type.

The third composition preferably contains 96 to 99 weight-%, in particular 97 weight-% of PP homopolymer, in particular the 1302 L type, as well as 1 to 4 weight-%, in particular 3 weight-% of nucleation agent, in particular the NU 10 type. Here again, the type designations are commercial designations of BASF.

The fourth composition preferably corresponds to the second composition.

A combination of rigidity and elasticity of the card is surprisingly achieved by means of this combination of different polymers, fillers, etc., which is unexpected. The cards produced in this way have properties similar to PVC cards, i.e. material properties which up to now had not been expected in connection with polypropylene.

If it is intended to glue ICs into the cards in order to produce so-called chip cards, it is advantageous if there is at least one bonding layer contained in the card, which is embodied in at least one of the first core component layers and/or between two second component layers or in an outer component layer in such a way that it is possible to glue a microchip on the bonding layer. The customary machining or cutting for receiving the microchip is therefore performed in such a way that the bonding layer is not completely removed, but instead forms a substrate for gluing on a microchip. In the process the bonding layer is preferably coextruded with at least one of the adjoining layers, so that detachment of the bonding layer from its substrate is assuredly prevented.

Exemplary embodiments of the invention will be described in detail below with reference to the drawings.

BRIEF DESCRIPTION OF THE DRAWING

FIG. 1 shows a first embodiment of the ID card in accordance with the invention in a partial cross-sectional view.

FIG. 2 represents a second embodiment of the invention.

FIGS. 4 to 10 respectively show a third to ninth embodiment of the invention in views corresponding to that of FIG. 1.

DETAILED DESCRIPTION OF THE PREFERRED EMBODIMENTS

Figure 3:
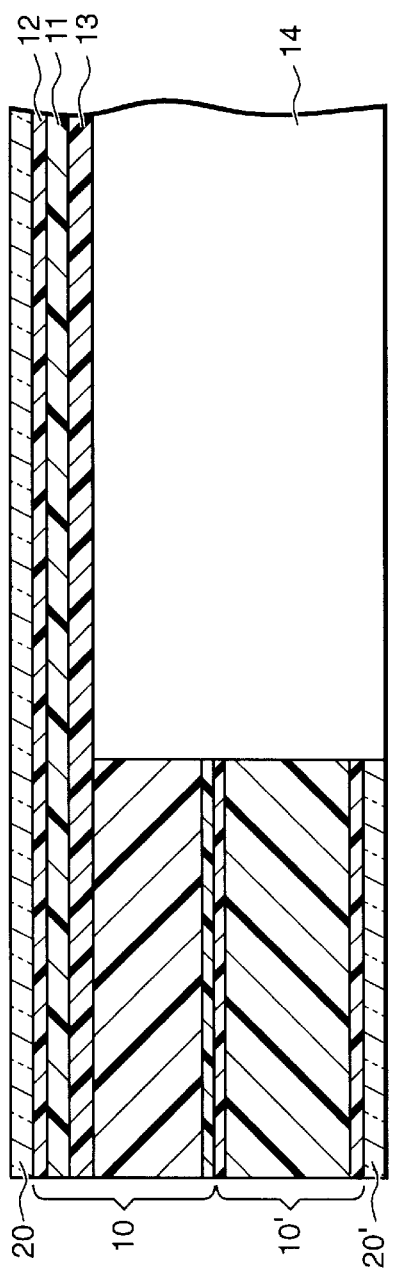
FIG. 3 is a partial section through the card in FIG. 2.

In the embodiment of the invention shown in a cross-sectional view in FIG. 1, two core layers 10, 10' and two outer layers 20, 20' covering core layers 10 and 10' are provided. Each core layer can also be referred to as a core member and each outer layer can also be referred to as an outer member. The first core layer 10 has a first core component layer 11, which is covered on each of its exterior faces by a respective one of second core component layers 12. The second core component layers are connected with the first core component layer by coextrusion. The same layer structure applies to the second core layer 10'.

First outer layer 20 comprises a first outer component layer 21 to whose two faces second outer component layers 22 are applied. Here, too, the second outer component layers 22 are again connected with the first outer component layer 21 by coextrusion. The same applies to the second outer layer 20'.

It already becomes clear from the above that the core layers 10, 10' and the outer layers 20, 20' are respectively (co)extruded separately from three component layers. The surfaces created in this manner are laminated together, i.e. fixedly connected with each other by means of heat and pressure.

The outer layers 20, 20' are transparent. The second outer component layers 22, 22' preferably consist of approximately 97 weight-% of polypropylene of the 3520 LX type (BASF) and approximately 3 weight-% of NU 10 (BASF) and have a layer thickness of approximately 5 μm. The first outer component layers 21 preferably consist of polypropylene of the 1302 L type in the amount of approximately 97 weight-% and approximately 3 weight-% of NU 10 . The layer thickness is approximately 140 μm.

The core layers 10, 10' comprise the first core component layers 11, 11' which respectively consist of approximately 97 weight-% of polypropylene of the 3520 LX type and approximately 3 weight-% of NU 10 . Thus the composition corresponds to that of the second outer component layer. The layer thickness is approximately 15 μm.

The first core component layer 11 is approximately 245 μm thick and consists of approximately 70 weight-% of polypropylene of the 2309 KX type, approximately 5 weight-% of polypropylene of the 1100 L type, approximately 5 weight-% of a dye (white) of the P 8555 type (Schulmann) and approximately 20 weight-% of talcum powder of the PPTV type (Westensee).

The second core layer 10' and the second outer layer 20' exactly correspond in their structure and their composition to the first core layer 10 and the first outer layer 20, respectively.

The total thickness of a card according to the invention is approximately 850 μm, such as is prescribed for ID cards by standardization.

In the following description of further embodiments of the invention the same reference numerals are used for the same component layers, wherein the same reference numerals also always indicate the same compositions as specified in detail above.

In the embodiment represented in FIGS. 2 and 3, each outer layer 20, 20' consists of a layer of biaxially drawn or oriented PP (Mobil Plastik MB 400) of a layer thickness of approximately 40 μm.

The first core layer 10 comprises a first core component layer 11 of a layer thickness of approximately 45 μm, on whose face which faces the outer layer 20 a second core component layer 12 is provided, and on whose other face a bonding layer 13 is provided. The layers 11 to 13 have been coextruded. The bonding layer 13 consists of Fusabond (DuPont), i.e. a material which by itself alone already has good adhesive properties.

In the embodiment shown in FIGS. 2 and 3, there is now provided a further first core component layer 11' adjoining the bonding layer 13, and a further second core component layer 12' is provided on the first core component layer 11'. Thus the first core layer consists of a total of five component layers in this embodiment. The second core layer 10' is constructed as previously described with reference to FIG. 1.

As indicated in FIG. 3, for inserting an IC, a portion of the card material is reamed out in such a way that the bonding layer 13 is essentially uncovered. It is now possible to glue an IC chip into the recess 14 resulting from this removal. The layer thicknesses in this embodiment are (in FIG. 2 from the top to the bottom) as follows: outer layer 20—40 μm, second core component layer 12—15 μm, first core component layer 11—45 μm, bonding layer 13—50 μm, first core component layer 11'—260 μm, second core component layer 12'—15 μm, second core component layer 12"—15 μm, first core component layer 11"—355 μm, second core component layer 12"—15 μm and (second) outer layer 20'—40 μm.

Figure 4:
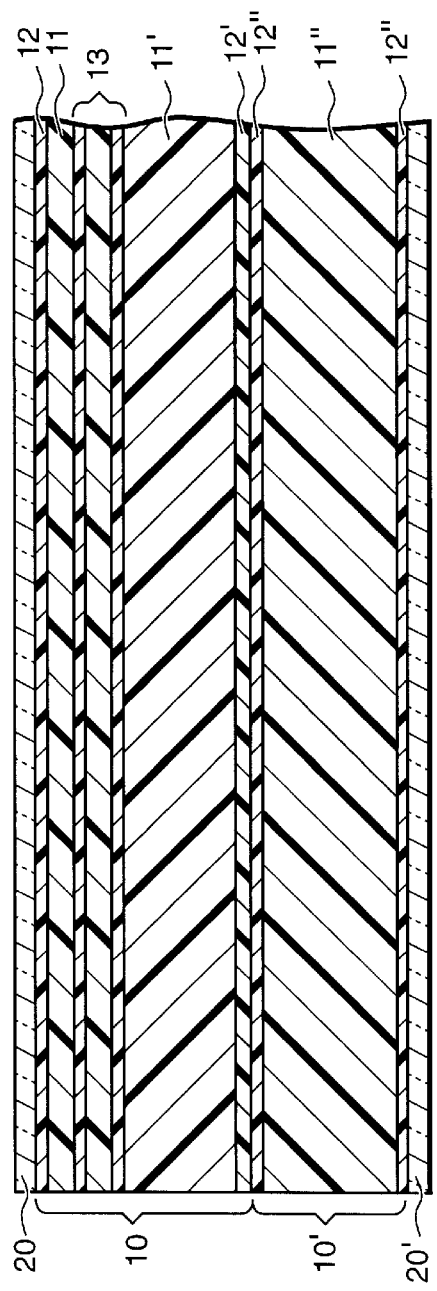

The embodiment of the invention shown in FIG. 4 differs from that of FIGS. 2 and 3 in that the bonding layer 13 consists of a layer of Surlyn (DuPont) (layer thickness 40 μm), on whose two faces a primer (5 μm) is provided. Otherwise the structure corresponds to that of the embodiment explained by means of FIG. 2, which also applies to the layer thicknesses.

The embodiment represented in FIG. 5 differs from that in FIG. 1 in that in place of the three-layered structure of the outer layers 20, 20', a biaxially drawn polypropylene foil (Mobil-Plastik MB 400) is used.

The embodiment of the invention shown in FIG. 6 again has a bonding layer 13 corresponding to the embodiment described in FIGS. 2 and 3 (Fusabond). In the embodiment represented in FIG. 6, this bonding layer 13 is provided between the first outer component layer 21 and the second (interior) outer component layer 22 of the outer layer 20. Otherwise the structure of this embodiment corresponds to that of the embodiment in FIG. 1.

The embodiment of the invention shown in FIG. 7 differs from that in FIG. 6 in that the bonding layer 13 is constructed of three layers, the same as in the exemplary embodiment in accordance with FIG. 4, i.e. it consists of a layer of Surlyn with primer on both sides.

In the embodiment of the invention in accordance with FIG. 8 the outer layer (if it is necessary at all) is embodied as a coating. Thus this embodiment consists of only two core layers 10, 10', wherein the core layer 10 (on top in FIG. 8) comprises two core component layers 11, 11', which are connected with each other by means of a bonding layer 13 (Fusabond).

The embodiment of FIG. 9 differs from that of FIG. 8 in that the bonding layer 13 consists of Surlyn with primer on both sides, as in the embodiments of FIGS. 4 or 7.

The simplest embodiment of the invention illustrated in FIG. 10 again consists of outer layers in the form of a clear coating and core layers 10, 10' constructed the same as in the embodiment of FIG. 1.

It can be seen from the above explanations that an entire range of variations is possible. However, it is essential that the individual PP layers 11, 21, made of polypropylene with a high melting point, are connected by means of PP layers 12, 22 or a bonding layer 13 with a lower melting point. This is assured by the described compositions, which has as a result that it is possible to produce very solid cards relatively simply. The multi-layered construction of the core layer is particularly advantageous in that the printing on thinner layers and subsequent lamination are particularly simple.

This application relates to subject matter disclosed in German Application number P 44 36 302.8, filed on Oct. 11, 1994, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An information-bearing card with at least one machine-readable data support, said card comprising a core member having an exterior surface, and at least one outer member, wherein said outer member is laminated onto the exterior surface of said core member and wherein:

said core member is a multilayer laminate comprising
a first core component layer (11) which comprises a polypropylene block polymer, a polypropylene homopolymer, or a mixture thereof, and
at least one unoriented second core component layer (12) adhered to a surface of said first core component layer, wherein said second core component layer comprises polypropylene; and said outer member is a multilayer laminate comprising
a first outer component layer (21) which comprises polypropylene, homopolymer and
at least one unoriented second outer component layer (22) which comprises polypropylene, wherein the second outer component layer is adhered to the first outer component.

2. A card in accordance with claim 1, further comprising a magnetic strip, an embedded microchip, or a printed image.

3. A card in accordance with claim 2, wherein the printed image is applied to the second core component layer (12) or to the second outer component layer (22) facing the second core component layer (12).

4. A card in accordance wit claim 1, wherein said outer member is biaxially drawn.

5. A card in accordance with claim 1, wherein the first core component layer comprises: 15 to 25 weight-% of a filler; 4 to 6 weight-% of a dye; 0 to 5 weight-% of said polypropylene homopolymer; and 64 to 81 weight-% of said block polymer.

6. A card in accordance with claim 5 wherein there is 20 weight-% of the filler.

7. A card in accordance with claim 5 wherein the filler is talcum powder.

8. A card in accordance with claim 5 wherein there is 5 weight-% of the dye.

9. A card in accordance with claim 5 wherein there is 5 weight-% of the polypropylene homopolymer.

10. A card in accordance with claim 5 wherein there is 70 weight-% of the block polymer.

11. A card in accordance with claim 1 wherein at least one of the second core component layer and the second outer component layer comprises: 95 to 99 weight-% of block polymer; and 1 to 5 weight-% of a nucleation agent.

12. A card in accordance with claim 11 wherein there is 97 weight-% of the block polymer.

13. A card in accordance with claim 11 wherein there is 3 weight-% of the nucleation agent.

14. A card in accordance with claim 1 wherein the first outer component layer comprises: 96 to 99 weight-% of said polypropylene homopolymer; and 1 to 4 weight-% of a nucleation agent.

15. A card in accordance with claim 14 wherein there is 97 weight-% of polypropylene homopolymer.

16. A card in accordance with claim 14 wherein there is 3 weight-% of the nucleation agent.

17. A card in accordance with claim 1 further comprising at least one bonding layer (13) which is provided at at least one of the following locations: in the first core component layer (11), and between the at least one second core component layer (12) and the at least one second outer component layer (22), said at least one bonding layer being adapted to have a microchip glued thereto.

18. A card in accordance with claim 17 wherein the bonding layer (13) adjoins and is coextruded with at least one of said component layers.

19. A card in accordance with claim 1 wherein said at least one second core component layer of said first core member comprises two second core component layers connected to said first core component layer; and further comprising a second core member identical to said first core member, and further wherein one of said second core component layers of said first core member is connected to one of said second core component layers of said second core member.

20. An information-bearing card with at least one machine-readable data support, said card comprising two core members each having two exterior faces, and at least one outer layer, wherein said at least one outer layer covers one of the exterior faces of one of the core members, wherein:

each of said core members is a multilayer laminate comprising a first core component layer which comprises a polypropylene block polymer, a polypropylene homopolymer, or a mixture thereof, said first core component layer having two outer faces, and two unoriented second core component layers each comprising polypropylene, said second core component layers being disposed on respective outer faces of said first core component layer and defining exterior faces of said core member;

said outer layer is a coating; and said first and second core component layers of each of said core members are connected with each other.

21. A card in accordance with claim 20 wherein the first core component layer comprises: 15 to 25 weight-% of a filler; 4 to 6 weight-% of a dye; 0 to 5 weight-% of said polypropylene homopolymer; and 64 to 81 weight-% of said block polymer.

22. A card in accordance with claim 21 wherein there is 20 weight-% of the filler.

23. A card in accordance with claim 21 wherein the filler is talcum powder.

24. A card in accordance with claim 21 wherein there is 5 weight-% of the dye.

25. A card in accordance with claim 21 wherein there is 5 weight-% of the polypropylene-homopolymer.

26. A card in accordance with claim 21 wherein there is 70 weight-% of the block polymer.

27. A card in accordance with claim 20 wherein said first core component layer comprises: 95 to 99 weight-% of said block polymer; and 1 to 5 weight-% of a nucleation agent.

28. A card in accordance with claim 27 wherein there is 97 weight-% of the block polymer.

29. A card in accordance with claim 27 wherein there is 3 weight-% of the nucleation agent.

30. A card in accordance with claim 20 wherein said first core component layer comprises: 96 to 99 weight-% of said polypropylene homopolymer; and 1 to 4 weight-% of a nucleation agent.

31. A card in accordance with claim 30 wherein there is 97 weight-% of polypropylene homopolymer.

32. A card in accordance with claim 30 wherein there is 3 weight-% of the nucleation agent.

33. A card in accordance with claim 20 further comprising at least one bonding layer (13) forming a component of one of said core members, said at least one bonding layer being adapted to have a microchip glued thereto.

34. A card in accordance with claim 33 wherein the bonding layer (13) adjoins and is coextruded with at least one of said component layers.

* * * * *